United States Patent Office 3,497,496
Patented Feb. 24, 1970

3,497,496
PROCESS FOR REDUCING THE VISCOSITY OF CELLULOSE ETHERS
Carlton Lee Crane, Rochester, N.Y., assignor to Eastman Kodak Company, Rochester, N.Y., a corporation of New Jersey
No Drawing. Filed Dec. 21, 1967, Ser. No. 692,265
Int. Cl. C08b *11/20*
U.S. Cl. 260—232         9 Claims

ABSTRACT OF THE DISCLOSURE

The present invention provides a method for reducing the viscosity of high-viscosity cellulose ethers comprising treating the cellulose ether dissolved in an aliphatic carboxylic acid with from about 0.05 to about 10 percent of sulfoacetic acid based upon the amount of cellulose ether being treated.

---

This invention relates to low-viscosity cellulose ethers and more particularly to a method for making the same.

In order to obtain cellulose ether film suitable for use in a variety of film forming applications well known to those skilled in the art, it is necessary to begin with a cellulose ether starting material which is relatively highly soluble in conventional volatile film casting solvents. The conventional high-viscosity cellulose ethers do not possess these solubility characteristics and, hence, it has been sought for a number of years to provide methods for converting the aforementioned high-viscosity and therefore relatively insoluble cellulose ethers into low-viscosity and readily soluble ethers suitable for casting clear, thin film from conventional solvents.

In the prior art, low-viscosity cellulose ethers were generally produced by treating high-viscosity cellulose ethers dissolved in acetic acid with mineral acids, for example, sulfuric, phosphoric and hydrochloric acid or acid sulfates and mixtures thereof. Although such methods produced low-viscosity cellulose ethers, the conventional viscosity-reducing acids invariably combined to some extent with the cellulosic material to result in the formation of cellulose ethers having the desired low viscosity, but also containing, chemically combined therewith, portions of the mineral acid (such as the sulfate group, when sulfuric acid or acid sulfates were used). The combined portion of the acid, and in particular the sulfate and phosphate radical, were very difficult to remove from the low-viscosity ether. In fact, although some of the combining acid itself (which invariably remained in the ether after treatment) could be washed out of the ether, a certain minimum of about .005 percent of the "combined impurity" generally remained even after thorough washing. The presence of this "impurity" detracted from the stability of low-viscosity cellulose ethers prepared in this manner and provided a product which, though satisfactory, was not sufficiently resistant to the effects of heat and moisture in some end uses.

Furthermore, it was very difficult to wash the uncombined acids used to reduce cellulose ether viscosity out of the material once viscosity had been reduced to a desired value. Indeed, a portion of the acid usually remained in the low-viscosity material and further contributed to its degradation.

It is, therefore, an object of the present invention to provide an improved method for reducing the viscosity of high-viscosity cellulose ethers which method yields a substantially "pure" low-viscosity cellulose ether having substantially improved stability.

According to the present invention there is provided a method for reducing the viscosity of high-viscosity cellulose ethers comprising the step of treating the high-viscosity cellulose ether dissolved in an aliphatic carboxylic acid of at most about 18 carbon atoms with sulfoacetic acid in the absence of any combining acid radicals.

More particularly, the invention provides a method as described above which comprises treating the high-viscosity cellulose ether dissolved in an aliphatic acid of at most about 18 carbon atoms with from about 0.05 to about 10 percent by weight of sulfoacetic acid based upon the amount of high-viscosity cellulose ether being treated by heating the reaction mixture formed by admixing the high-viscosity cellulose ether dissolved in aliphatic acid and sulfoacetic acid to from about 80 to about 180° F. for a period of from about 5 minutes to about 10 hours.

The cellulose ethers which may be treated according to the processes of this invention include any of the conventional "high-viscosity" cellulose ethers and in particular the "high-viscosity" ethyl and methyl ethers of cellulose. These latter materials are generally useful in photographic film manufacture and are generally (commercially) available only as high-viscosity materials (i.e., materials having a viscosity of above about 30 centipoise).

Further preferred for treatment in accordance with the processes of this invention are the ethyl ethers of cellulose ranging from about 42 to about 52 percent by weight in ethoxyl content and having a viscosity of from about 30 to about 200 centipoise at a concentration of 5 percent by weight in toluol/3A alcohol (8:2) at 25° C.

Toluol/3A alcohol (8:2) signifies that toluol and 3A alcohol are blended in the ratio of 8 to 2 by volume. 3A alcohol is a commonly used form of denatured ethyl alcohol made by blending commercial methyl alcohol and ethyl alcohol in a ratio of 5 gallons methanol/100 gallons ethanol.

Sulfoacetic acid can be obtained in commercial quantities or prepared by reacting sulfuric acid and acetic acid to form acetyl sulfuric acid (a "combining" acid frequently used to lower the viscosity of cellulose ethers) and then heating to from about 160° to about 200° F. for an extended period to cause rearrangement of the acetyl sulfuric acid into sulfoacetic acid required by this invention. When prepared as just described, the desired acid usually contains some acetic acid and according to the processes of this invention, it may be used without removal of this acetic acid and is preferably utilized in any event as a solution at concentrations of about 95 percent by weight of sulfoacetic acid in the aliphatic carboxylic acid described below. This latter sulfoacetic acid concentration is desired only for achievement of the optimum results and described below is not in any way critical.

The amount of sulfoacetic acid utilized in the viscosity reduction process of this invention may vary considerably depending upon the initial and final viscosity of the cellulose ether as well as the speed with which it is desired to conduct the reduction. More rapid and complete viscosity reductions occur with increased concentrations of the sulfoacetic acid. It has generally been found that concentrations of sulfoacetic acid ranging from about 0.05 to about 10 percent by weight of the cellulose ether give satisfactorily rapid and uniform viscosity reduction with optimal, rapid and more readily controllable results being achieved when sulfoacetic acid concentrations of from about 0.5 to about 3 percent by weight of the cellulose ether are utilized.

The aliphatic carboxylic acids which form the solvent for the cellulose ethers as well as the medium for the viscosity reduction reaction include all of such acids which have at most 18 carbon atoms. This group, of course, includes the lower aliphatic acids such as formic, acetic, propionic and butyric as well as stearic acid all of which are preferred as the reaction medium due to their ready availability and relatively low cost. Specifically preferred as the solvent and reaction medium is acetic acid which is most readily available and is a superior and more conventional solvent for cellulose ethers such as those being treated here. Although any of the aliphatic acids used in the treatment can be diluted with water after dissolution of the cellulose ether (as described below), the use of a concentrated acid (i.e., above about 90 percent by weight in water) is specifically preferred as providing more complete dissolution of the cellulose ether initially.

The acetic acid which serves as the preferred solvent for the ether and as a medium for the desired viscosity reduction reaction is preferably glacial (i.e., 99.5+ percent glacial acetic acid). Although beneficial results can be achieved at reduced viscosity reduction rates in less concentrated acetic acid mediums, the use of such concentrated solutions is specifically preferred as providing significant process and product advantages as shown in the examples described below. Concentrations of the aliphatic carboxylic acid above about 90 percent by weight produce very good cellulose ether viscosity reduction and product advantages.

This process is conveniently carried out by dissolving a cellulose ether of the type described above in glacial acetic acid and then adding the sulfoacetic acid to form a reaction mixture.

The treatment of the cellulose ether should be carried out at elevated temperatures, i.e., temperatures of from about 80 to 180° F. As would be expected, reduction of viscosity is faster at the upper limits of this range and, as a matter of practical process preference, temperatures in the range of 140 to 170° F. are preferred as providing the most rapid reduction under the most ideal conditions from a control point of view. At temperatures below the 80° F. minimum of the treatment range, viscosity reduction will occur but at a substantially reduced rate which will require treatment for days and even weeks or months; at temperatures above the recommended 180° F. maximum, excessive color develops in the system indicating degradation of the ether.

The period for which the particular cellulose ether is treated can vary widely depending upon the initial viscosity of the starting material, the concentration of the sulfoacetic acid used in the treatment, and the final viscosity to be obtained, among other parameters. Generally, however, detectable reduction of viscosity will commence after about 5 minutes of treatment and maximal viscosity reduction will be achieved in almost all cases, wherein the treatment conditions lie within the ranges described herein, after treatment for a period of about 10 hours. Under the preferred heating conditions described above, and as demonstrated in the examples below, a treatment for from about 30 minutes to about 5 hours will generally be adequate to provide optimum results under the preferred conditions with the preferred concentrations described herein.

Treatment for periods of above about 5 minutes generally produce reduction in intrinsic viscosity of at least about 0.2 within the ranges of conditions described hereinafter. Ordinarily, in the preferred practice of this invention as exemplified at least in part by the examples below, the intrinsic viscosity of the cellulose ethers as measured in a toluol/3A alcohol system is reduced from well above 1 (about 1.91 in the case of the 46.4 percent ethoxyl ethyl ether) to below about 1 (0.35 in the case of the above ether) after treatment for one hour.

When the desired reduced viscosity is reached, the reaction product can be precipitated by pouring the reaction solution into an agitated water bath. The precipitate can then be drained, washed with water until substantially free of uncombined acids, and then dried.

It should be noted that although most foreign substances will not generally affect the outcome of the present process, the treatment solutions must be free of combining inorganic acid radicals and especially the sulfate ($SO_4$) and phosphate ($PO_4$) radicals if the highly stable products of the processes of this invention are to be obtained. Small concentrations of such combining radicals present in the treatment solutions can cause addition thereof to the cellulose ether and result in a product having the same disadvantages as those cellulose ethers of the prior art whose viscosity was reduced using sulfuric, phosphoric, hydrochloric, or some other combining acid. Thus, it is critical that the treatment solutions be substantially free of such combining acids to produce cellulose ethers of reduced viscosity and significantly improved stability.

It is possible to increase the speed of the viscosity reduction by conventional methods such as stirring, and the application of elevated pressure and these techniques may be used according to the requirements of the particular operation.

Should it be desired to slow the viscosity reduction, water can be added to the treatment solutions. This type of addition will not hinder the viscosity reduction reaction in any way, except to reduce the viscosity reduction rate, nor reduce the stablity of the final product. However, since it serves to dilute the sulfoacetic acid, this will to some extent slow the reaction, and the limit on the amount of water which can be added to the system is generally determined by the rate at which viscosity reduction is desired. Generally, the reaction progresses with the addition of up to about 50 percent by weight of the water based upon the amount of cellulose ether being treated and will permit the viscosity reduction reaction to proceed, but with optimum results being achieved when (as demonstrated in the examples below) less than about 10 percent by weight of water is added. It should be noted here that the presence or absence of any specific quantity of water in the system is not critical and that rapid viscosity reduction may be accomplished in a substantially anhydrous system (the only water present being that donated by the moisture content of the cellulose ether) or in very dilute aqueous solutions if the process reaction is to occur in warehouse stored storage drums over an extended period of time. If the cellulose ether being treated has a larger than usual moisture content (i.e., above about 5 percent), this will slow the reduction process naturally and it may be compensated for by the addition of an increased amount of acid or the application of a higher temperature or pressure than would normally be used for the treatment of the substantially water-free ether.

It should be noted that as the ethoxyl content and viscosity of the various cellulose ethers vary, so too will their ability to tolerate the presence of water; hence, caution should be exercised not to introduce excessive amounts of water into any particular system.

The following examples illustrate my invention, it being understood that the examples are included for purposes of illustration and not to in any way limit the scope of the invention.

EXAMPLE 1

15.2 parts ethyl cellulose (ethoxyl content 46.4%, [n] 1.91 in toluol/3A alcohol 8:2) with a moisture content of 1.5% is placed in a jacketed sigma-bladed mixer together with a mixture consisting of 18.4 parts acetic acid and 0.9 part distilled water. The mixture is heated and stirred at 160° F. until a uniform, clear solution is obtained.

A mixture consisting of 0.176 part 95% sulfoacetic acid, 3 parts acetic acid, is added to the bath as rapidly as it could be uniformly dispersed. The temperature of the reaction solution is maintained at 160° F. and samples are removed from the reaction solution at hourly intervals over a 3 hour period of time.

Each sample is diluted with sufficient parts of acetic acid which insures a soft, uniform precipitation when poured into an agitated water bath. The precipitate is washed in successive changes of distilled water until substantially free from uncombined acids and dried.

All the products give good solutions at 15% concentration in water/methanol/isopropanol/anhydrous ethanol— 6.9/5.1/14.6/73.4%. See Table 1 for analyses.

TABLE I

| Ethoxyl content | Treatment time in hours | [n] in Toluol/3A Alcohol 8:2 | M.P. (° C.) |
|---|---|---|---|
| 46.4% | Untreated | 1.91 | 209 |
| | 1 | 0.35 | 163 |
| | 2 | 0.22 | 161 |
| | 3 | 0.15 | 150 |

EXAMPLE 2

Example 1 is repeated, except that 0.077 part of 95% sulfoacetic acid are used. Four samples are taken at hourly intervals. The analytical results are given in Table II.

TABLE II

| Ethoxyl content | Treatment time in hours | [n] in Toluol/3A Alcohol 8:2 |
|---|---|---|
| 46.4% | Untreated | 1.91 |
| | 1 | 0.41 |
| 46.1% | 2 | 0.32 |
| | 3 | 0.22 |
| | 4 | 0.15 |

All samples, except the untreated ethyl cellulose, are soluble in the solvent system described in Example 1.

EXAMPLE 3

Example 1 is repeated, except that 0.022 part of sulfoacetic acid are used and five samples are taken at hourly intervals. For analytical results see Table III (column 9a).

It will be noted in Table III that the high viscosity untreated ethyl cellulose A is insoluble in the solvent system and the low viscosity untreated product M dissolved to give a solution but the solution contains grain and has the same viscosity as the C product. The solubility of the C product prepared by my process is excellent and free from grain. Products A, B, C, and M all have a uniform white color after heating 8 hours in a glass tube at 160° C. Products D, E, and F are clear, uniform, light colored melts, after heating 8 hours at 160° C.

2. A process in accordance with claim 1 comprising the steps of:
   (a) admixing said sulfoacetic acid and said solution of said high-viscosity cellulose ether dissolved in said aliphatic carboxylic acid of at most 18 carbon atoms to form a reaction mixture; and
   (b) heating said reaction mixture to from about 80 to about 180° F. for a period of from about 5 minutes up to about 10 hours.

3. A process in accordance with claim 2 wherein there is added a recovery step for recovering the cellulose ether whose viscosity has been reduced comprising pouring said reaction mixture into an agitated water bath to form a precipitate of reduced-viscosity cellulose ether.

4. A process in accordance with claim 3 wherein said aliphatic carboxylic acid of at most 18 carbon atoms is selected from the group consisting of formic, acetic, propionic, butyric and stearic acids and is utilized in concentrations of at least about 90 percent by weight in water.

5. A process in accordance with claim 4 wherein said aliphatic carboxylic acid of at most 18 carbon atoms is acetic acid.

6. A process in accordance with claim 5 wherein said acetic acid is glacial acetic acid having a concentration of above about 99.5 percent by weight in water.

7. A process in accordance with claim 4 wherein said high-viscosity cellulose ether is treated with from about 0.5 to about 3 percent by weight of sulfoacetic acid based upon the amount of said high-viscosity cellulose ether being treated by heating to from about 140 to about 170° F. for a period of from about 30 minutes up to about 5 hours.

8. A process in accordance with claim 7 wherein said high-viscosity cellulose ether is selected from the group consisting of methyl cellulose and ethyl cellulose.

9. A process in accordance with claim 8 wherein said ethyl cellulose has an ethoxyl content of from about 42 to about 52 percent by weight and a viscosity of from about 30 to about 200 centipoises at a concentration of 5 percent by weight in toluol/3A alcohol (8:2) at 25° C. and a viscosity after treating of below about 30 centipoises at a concentration of 5 percent by weight in toluol/3A alcohol (8:2) at 25° C.

TABLE III

| Product identification | A | B | C | D | E | F | M |
|---|---|---|---|---|---|---|---|
| Treatment time in hours | Untreated | 1 | 2 | 3 | 4 | 5 | Untreated |
| [n] in Toluol/3A alcohol, 8:2 | 1.91 | 1.11 | 0.83 | 0.68 | 0.65 | 0.59 | 0.85 |
| 5% concentration in toluol/3A alcohol 8:2 at 25° C. | 99 cp | 17.9 cp | 10.3 cp | 7.0 cp | 5.0 cp | 4.7 cp | 10.3 cp |
| 15% concentration in water, methanol, isopropanol, anhydrous ethanol 6.7/5.1/14.6/73.4% at 25° C. | insoluble | Soluble | Soluble 67 cp | Soluble 68 cp | Soluble 29 cp | Soluble | Soluble, slt. 67 cp. |

Samples A and M are commercial grades of ethyl cellullose with ethoxyl contents of 45–46.5%.

The invention has been described in detail with particular reference to preferred embodiments thereof, but it will be understood that variations and modifications can be effected within the spirit and scope of the invention as described hereinabove and as defined in the appended claims.

I claim:

1. A process for reducing the viscosity of cellulose ethers comprising treating in the absence of any combining inorganic acid radicals at a temperature of from about 80° C. to about 180° C. for from about 5 minutes to about 10 hours a solution of a high-viscosity cellulose ether dissolved in a solvent consisting essentially of an aliphatic carboxylic acid of at most 18 carbon atoms with from about 0.05 to about 10 percent by weight of sulfoacetic acid based upon the amount of said high-viscosity cellulose ether being treated.

References Cited
UNITED STATES PATENTS 2,915,520   12/1959   McAndrew ———————— 260—232
3,347,849   10/1967   Engelskirchen ———— 260—232

DONALD E. CZAJA, Primary Examiner

M. I. MARQUIS, Assistant Examiner

U.S. Cl. X.R.

117—166; 260—231